June 22, 1965
E. L. SCHMIDT
3,190,737
GLASS BEAD FURNACE AND METHOD OF MAKING GLASS BEADS
Filed July 7, 1960
2 Sheets-Sheet 1
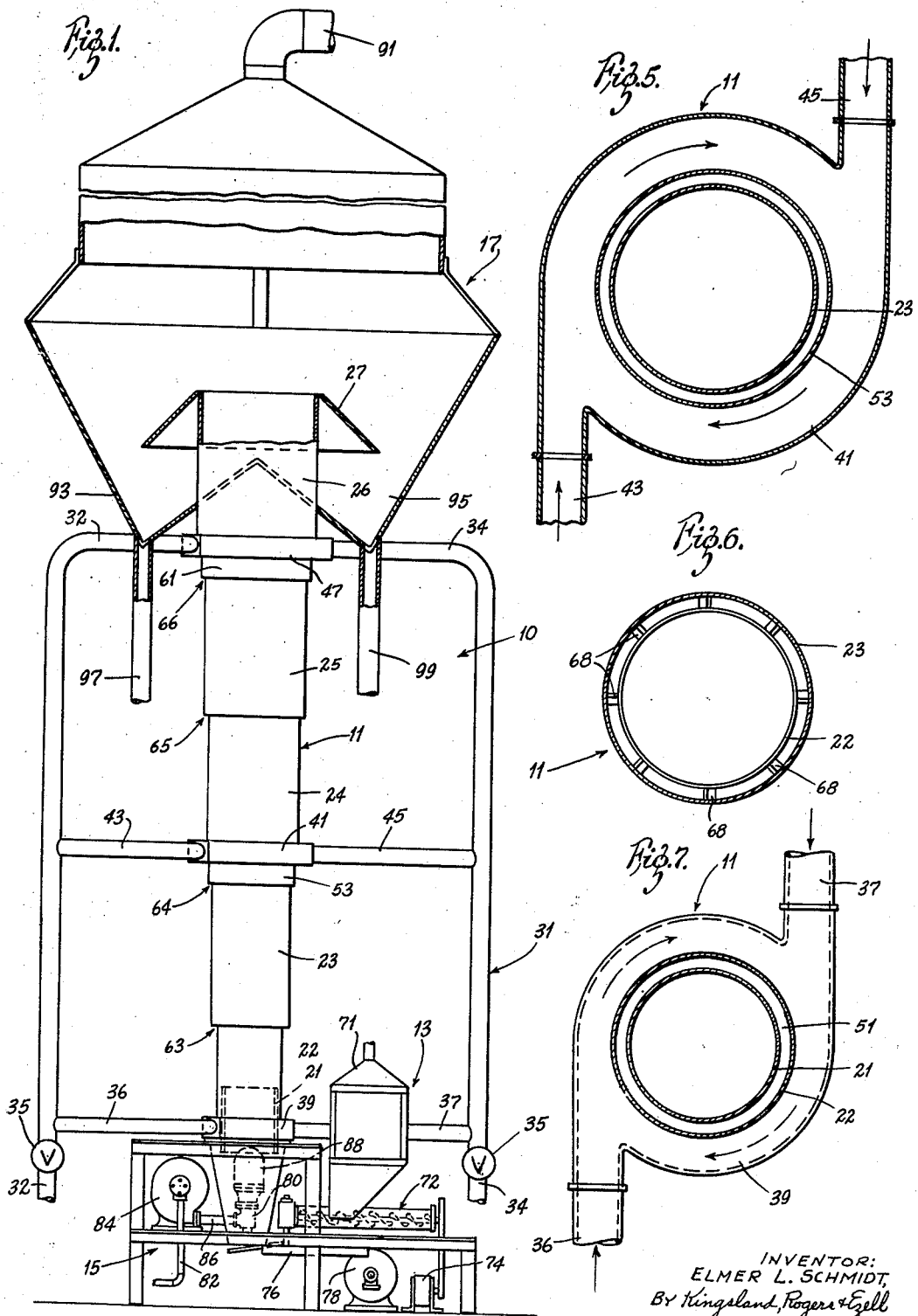
INVENTOR:
ELMER L. SCHMIDT,
By Kingsland, Rogers & Ezell
ATTORNEYS June 22, 1965   E. L. SCHMIDT   3,190,737
GLASS BEAD FURNACE AND METHOD OF MAKING GLASS BEADS
Filed July 7, 1960   2 Sheets-Sheet 2
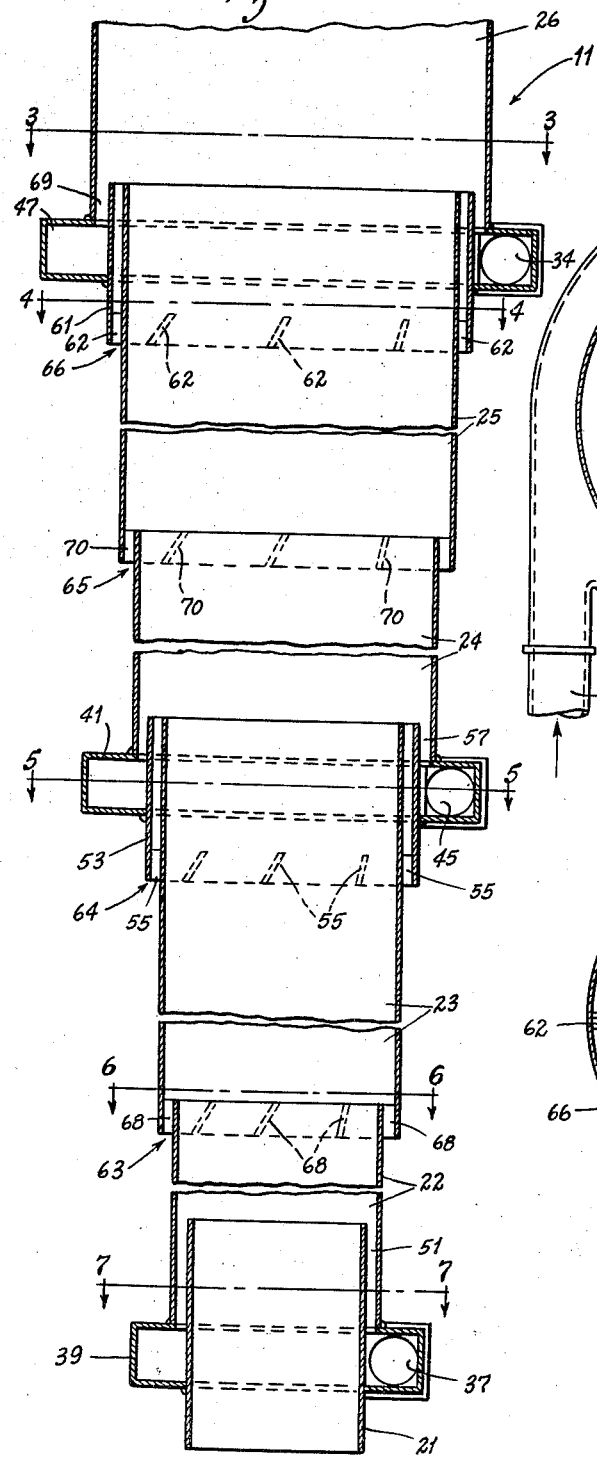
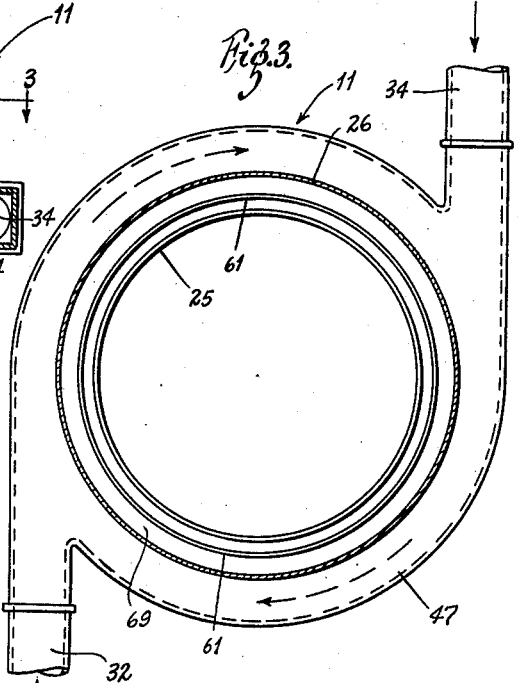
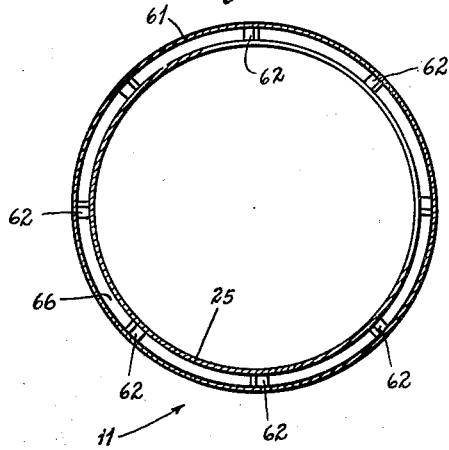
INVENTOR:
ELMER L. SCHMIDT,
BY Kingsland, Rogers & Ezell
ATTORNEYS

United States Patent Office 3,190,737
Patented June 22, 1965

3,190,737
GLASS BEAD FURNACE AND METHOD OF MAKING GLASS BEADS
Elmer L. Schmidt, St. Louis, Mo., assignor to Flex-O-Lite Manufacturing Corporation, St. Louis, Mo., a corporation of Missouri
Filed July 7, 1960, Ser. No. 41,358
8 Claims. (Cl. 65—21)

This invention relates to improvements in apparatus and method for forming glass beads, and, in particular, is concerned with a method and apparatus for forming glass beads from ground glass, which is subjected to high temperatures in a vertical furnace tube.

In the past glass bead furnaces have been made which used a vertical tube for the production of glass bead furnaces. These tubes are provided with a gas burner at the bottom and means for admitting ground glass in the region of the burner flame at the bottom of the tube under pneumatic pressure so that the glass particles are charged upwardly within the furnace and subjected to a high temperature within the furnace tube. By means of this high temperature the glass particles are softened and are caused to spherulize in the form of round glass beads. It has been found necessary in such furnaces to cool the sides of the furnace and also to rotate or vibrate the furnace to minimize the formation of glass accretion or slag on the interior walls of the tubes. The Bland Patent No. 2,600,963, assigned to applicant's assignee, Flex-O-Lite Manufacturing Corporation, shows one such furnace. Although such apparatus has been highly satisfactory in the formation of glass beads, the mechanism for rotating the tube and other mechanisms for vibrating the tube to prevent the formation of glass accretions have been necessarily somewhat complicated and expensive. Also, the vigorous mechanical action has led to a high degree of wear on the equipment due to the action of the moving parts.

In the instant invention it has been found that a stationary furnace tube can be employed by the provision of means for admitting air under pressure through the interior of the furnace around the interior of the walls to provide an upwardly rising air cushion. Further means are employed for the provision of ambient air alone or with the air under pressure in separate stages to the interior of the tube through air inlets that provide secondary air for combustion to an area removed from the interior side walls. The air charged to the furnace to provide the air cushion is under pressure and is introduced tangentially to the interior of the furnace tube in such a manner that it swirls around the inner walls of the furnace tube and is caused to rise upwardly in the manner of a helix to provide a protective cushion of air. By means of this charging of air under pressure, or by means of the natural draft of the furnace tube, the secondary air, which provides for the entry of ambient air from the atmosphere surrounding the apparatus, works in the fashion of an aspirator to suck in the secondary air.

By means of the above-mentioned features there have been provided several advantages. The first of these is the provision of an upwardly rising helical cushion of air around the interior of the draft tube that serves to cool the interior walls and thereby offers resistance to the formation of glass slag or other glass accretions to the interior of the furnace walls. In addition, the upwardly rising cushion of air provides a physical barrier to the formation of glass accretions upon the interior furnace walls. Also, the glass particles, which are caused to move upwardly, resist moving against the side walls, because of the air cushion, and deformations and malformations in the spherulized glass beads, that might be caused by physical contact with the interior furnace walls, are obviated.

An additional feature provided by this invention is the ready admission of secondary air at various points along the furnace tube by the aspirating action of the pressurized upwardly rising air cushion with its helical movement.

The above features have provided a method and apparatus for making glass beads from a stationary furnace without requiring any moving parts in the operation of the furnace itself. It has been found that the air cushion can be provided through several stages. Each of these stages may be situated at a different vertical level in the furnace tube to provide for the maintenance of the helical air cushion along the interior of the walls. The various stages may be effected, as will be fully described hereinbelow, by the admission of air under pressure applied tangentially at the interior of the furnace walls. When so admitted the air will tend to swirl around the interior of the tube and, because of the natural draft of the furnace, and also because of the construction of the air inlet passages, will be caused to rise upwardly in a helical fashion around the interior of the furnace walls.

It will also be apparent that the invention can be used in horizontal furnaces, i.e., where the draft tube is disposed horizontally with a burner and means for charging air and ground glass at one end with an exit at the other end. The various stages of this invention may be provided along such a tube in the same fashion as for the vertical furnace, which will, for purposes of example, be particularly described below.

It is accordingly a primary object of this invention to provide method and apparatus for making glass beads in a furnace tube in which an interior cushion of air is provided along the interior walls of the furnace tube.

It is a further object of this invention to provide a method and apparatus for making glass beads from a stationary furnace tube in which air is admitted tangentially to the interior of the furnace tube in such a manner that air is caused to swirl along the interior wall of the furnace and follow along these walls in a helical fashion.

Still another object of this invention is to provide a method and apparatus for making glass beads in a stationary tube in which a burner is provided at the bottom of the tube with admission of ground glass particles and air is charged tangentially to the furnace tube in such a manner that it is caused to circulate in a helical fashion and progress within the tube to provide a cushion along the interior of the tube.

Yet a further object of this invention is to provide a method and apparatus for charging air under pressure to the interior of a furnace tube in such a manner that a helical cushion of air is effected along the interior walls of the tube and in which secondary air can be admitted by an aspirating action.

Still another object of this invention is to provide a method and apparatus for admitting air to the interior of the furnace tube by means of an aspirating action to provide a cushion of air around the interior of the furnace tube.

Yet a further object of this invention is to provide a method and apparatus for making glass beads in a vertical furnace tube that is stationary and has means for charging glass particles in the region of a burner flame at one end of the furnace tube with a cushion of air provided along the interior of the tube by air charging means, and with secondary air being admitted by an aspirating action at various points along the furnace tube.

Further objects of this invention will appear in the detailed description which follows.

For the purpose of illustrating this invention, there is shown in the accompanying drawings a preferred embodiment in a vertical furnace. It is to be understood, however, that these drawings are for the purpose of example only and that the invention is not limited thereto since it may be used in a horizontal furnace also.

In the drawings:

FIGURE 1 is a view in front elevation and taken partly in section showing the furnace of this invention;

FIGURE 2 is an enlarged view in vertical section showing the construction of the furnace tube;

FIGURE 3 is a view in section taken on the line 3—3 of FIGURE 2 showing details of the furnace tube construction;

FIGURE 4 is a view taken in section on the line 4—4 of FIGURE 2 showing the aspirating structure for the admission of secondary air to the furnace tube;

FIGURE 5 is a view in section taken on the line 5—5 of FIGURE 2 showing details of the construction of the means for charging air under pressure;

FIGURE 6 is a view in section taken on the line 6—6 of FIGURE 2 showing further means for the construction of the aspirating means; and FIGURE 7 is a view taken in section on the line 7—7 of FIGURE 2 showing further means of the structure for admitting the air under pressure to the furnace tube.

Reference is now had to FIGURE 1 showing the furnace apparatus of this invention generally indicated by the reference numeral 10. As shown therein the furnace apparatus comprises a downwardly tapering furnace tube 11 comprised of cylindrical telescope sections, ground glass charging means generally indicated by the reference numeral 13, gas and air combustion means 15, and a glass bead collection hopper 17.

The construction of the furnace tube 11, which forms the novel features of this invention, is best shown in FIGURES 2 through 7, inclusive. As shown in FIGURE 2, the downwardly tapering furnace tube 11 is telescoped and is comprised of concentrically spaced sections 21, 22, 23, 24, 25 and 26. The bottom section 21 represents the bottom of the furnace tube, while the top section 26, which is connected to a conical baffle 27, represents the top of the furnace tube. Each one of the sections 21 through 25 is telescoped within the section above it in spaced relation. The spacing provides passages for the admission of air to provide for the establishment of an upwardly rising helical cushion of air in the interior of the furnace as will be more fully described hereinbelow.

The establishment of the cushion of air along the interior walls of the furnace is effected by an air charging system using the conduit framework identified by the numeral 31 in FIGURE 1. This conduit system 31 comprises two main conduits 32 and 34, controlled by valves 35, which, at their bottom end, may be joined together and connected to an air blower (not shown) as will be readily understood. The two main conduits 32 and 34 are then connected to branch conduits 36 and 37, respectively, which are connected to opposite sides of a bottom manifold 39. In like fashion an intermediate manifold 41 is connected by conduits 43 and 45 to conduits 32 and 34, respectively. Similarly a top manifold 47 is connected to the ends of conduits 32 and 34 at the top.

The bottom manifold 39 is best shown by reference to FIGURES 2 and 7. As shown therein, this manifold is of an annular construction and is connected at the bottom to the cylindrical furnace section 21 and at its top to the bottom of the furnace section 22. A space is, however, provided between sections 21 and 22 which opens to the top of the manifold and this space defines a passage indicated by the reference numeral 51.

The intermediate manifold 41 is constructed in a somewhat similar manner to the bottom manifold 39. The structure is best shown in FIGURES 2 and 5 where it will be seen that a modification in structure is used. In this structure an intermediate shell 53 is connected by slanted ribs 55 to the furnace section 23. The manifold 41 is then connected at its bottom to this intermediate section 53. The top of the manifold is connected to the bottom of section 24 and an annular passage opening 57 connecting the top of the manifold to the interior wall of section 24 is thereby provided.

The top manifold 47 is constructed in a manner similar to that just described for the intermediate manifold 41. Thus, an intermediate shell 61 is connected to the section 25 by slanted ribs 62. The manifold 47 is then connected at its bottom to the shell section 61 and at its top to the furnace section 26. An annular passage opening 69 then connects the top of the manifold to the interior wall of section 26.

The means for admitting secondary air to the furnace from the atmosphere is accomplished by the use of four telescoped stages designated by the reference numerals 63, 64, 65 and 66. Stages 63 and 65 provide for the admission of air at the interior of furnace section 23 and 25, respectively, while the stages 64 and 66 provide for the admission of secondary air at a point spaced from furnace sections 24 and 26, respectively, and interiorly of the furnace walls of these sections.

The first stage for the admission of secondary air, identified by the reference numeral 63, is best shown by referring to FIGURES 2 and 6. As there shown, furnace section 22 is connected to furnace section 23 in spaced relation by connecting ribs 68, which are slanted in the direction of the tangential connection of the air conduits to the manifold 39. The swirling cushion of protective air provided through manifold 39 thus draws the suction air into the tube in substantially the same direction as will be further described hereinbelow.

The stage 64 is shown in FIGURES 2 and 5 and is provided by the spacing between furnace section 23 and shell 53, which are connected in spaced relation by the slanted ribs 55. Stage 65 is connected in a similar manner to stage 63 by the connection of furnace section 24 to furnace section 25 in spaced relation by the slanted connecting ribs 70. Lastly, stage 66 is constructed in a similar manner to stage 64 by the connection of the intermediate shell 61 to furnace section 25 in spaced relation by the slanted ribs 62. This relationship and structure of stage 66 is shown in FIGURES 2, 3 and 4.

The construction of the glass charging means 13, the burner means 15, and the hopper 17, are all similar to that described in the Bland Patent No. 2,600,963, which shows the ready adaptability of the stationary furnace to existing furnaces.

The glass charging means 13 comprises a hopper 71 for ground glass which feeds into a screw conveyor 72 powered by a motor 74. The ground glass is charged into a pressure tube 76 into which air is introduced under pressure from a compressor 78. The mixed ground glass and compressed air is then charged to a T-fitting 80.

The burner means 15 comprises ta tube 82 for a combustion gas, which is mixed with air in a blower 84. The combined combuston gas and air is then charged through the tube 86 to the T-fitting 80. Combined gas, air, and ground glass are then discharged through a burner 88 upwardly through the bottommost section 21 of the furnace tube 11 where the ground glass particles are spherulized into glass beads according to this invention as will be further described hereinbelow.

The collecting hopper 17 comprises a W-shaped collection hopper having an outlet conduit 91 for the escape of waste gases. The bottom of the hopper has two converging sections 93 and 95 which lead into collection conduits 97 and 99, respectively, for the collection of glass beads which are charged to a collecting bin or other conventional receptacle (not shown).

This invention has been particularly described with respect to the combined use of the air charged under pressure in manifolds 39, 41 and 47 and 65, and the ambient air admitted by aspirating action in stages 63, 64, 65 and 66, as this is preferred for best results. It will be understood, however, that where desired the furnace tube may be constructed with only manifolds such as 39, 41, and 47, where air is charged under pressure, Alternatively, the furnace tube may be operated with only the stages 63, 64, 65 and 66 by closing the valves 35, or the furnace tube may even be constructed with stages 64 and 66, while omitting stages 63 and 65. The latter method and structure can be employed where glass adhesion to the furnace tube is less for certain particular circumstances.

Operation

The glass bead furnace of this invention is operated by charging ground glass and combustion gas in such a manner that the glass particles are caused to be discharged upwardly with the burner flame into the furnace 11. Thus, ground glass is charged from the hopper 13 through the screw conveyor mechanism 72 and mixed with compressed gas 76 and charged through T-fitting 80 into the burner nozzle 88. Combustion gas is mixed with air and charged through conduit pipe 86 into the burner where the gasses are combusted to produce a hot flame which is directly upwardly through substantially the entire extent of the furnace tube 11 to provide for heating throughout the tube.

As the glass beads and combustion gas travel upwardly the glass beads will decrease in velocity due to the larger cross sectional area of the furnace tube 11 as the vertical extent increases from the top of the bottom thereby increasing the dwell in the furnace and insuring complete heating so that the glass particles can melt and spherulize.

During this operation an air cushion is provided around the inner periphery of the furnace tube through the use of the charging manifolds 39, 41 and 47. Thus, air can be charged under pressure, such as one-half p.s.i.g. for purpose of example, through these manifolds and, because of the tangential introduction of the air in the manifolds, an upwardly swirling air cushion is effected.

In the production of the swirling cushion of air around the interior of the furnace, the manifold 39 provides this cushion by admitting air charged under pressure through the conduits 36 and 37. Thus, air, when introduced through these conduits, travels, tangentially in the general manner shown by the arrows in FIGURE 7, and, because the only means for outlet is provided through the annular passage 51, this swirling cushion of air will travel upwardly through the passage. As it leaves the passage the cushion of air will tend to hug the inner surface of section 22 and also the inner section of the next adjacent upper furnace section 23 because of the natural centrifugal force involved.

This swirling cushion of air provides protection in cooling for the furnace walls and also provides a barrier for the glass particles. Thus, it is more difficult for the glass particles to contact the inner sides of the furnace walls and they tend to remain in the center region of the furnace as they pass upwardly. The operation of the intermediate manifold 41 is similar to that just described for the bottom manifold 39. Thus, the cushion of air is formed in passage 57. Likewise, the top manifold 47 operates in a similar manner and the cushion of air is effected in the passage 65.

The first stage for the admission of secondary air 63 is provided just above the bottom manifold 39. Secondary air is drawn in from the atmosphere through the draft action provided through the upwardly rising cushion of air from this first manifold, and it is also tended to be brought in by the natural draft action of the combustion flame within the furnace. When this air is sucked in it is directed in the general helical direction of the upwardly rising cushion of air through passage 51 by the slanted ribs 68 which tend to act as baffles. This admission of secondary air through the first stage 63 acts to continue the maintenance of the cushion of air around the inner periphery of the furnace wall section 23. The stage 65 for the admission of secondary air operates in substantially identical fashion as that of stage 63, just described. Thus, it is created by the opening between furnace sections 24 and 25 connected by the slanted ribs 70. The secondary air is brought in by natural suction and the draft created by the cushion of air from manifold 41 and also by the natural draft action of the combustion gases within the furnace.

The stages 64 and 66 for the admission of secondary air act in a somewhat different fashion than that of stages 63 and 65. Thus, stages 64 and 66 are situated interiorly of the cushion of air created by the manifolds. Stage 64 is formed by the annular space between the intermediate section 53 and the furnace section 23, and is interior of the manifold passage 57 for the intermediate manifold. Thus, there will be created a suction both the exterior of the stage by the virtue of the passage 57 and also on the interior of this stage by the natural draft action of the combustion gases. The air so admitted provides secondary air for continuing combustion as well as a slight cushioning action. In like manner, stage 66 is formed by intermediate section 61 and furnace section 25 and is interior of the passage 65 used by the top manifold 47. The operation is similar to that just described for stage 64.

In the above operation it can readily be observed that glass particles are charged upwardly from the bottom of the furnace to the top and are contacted throughout with hot combustion flames. This causes the spherulizing of the ground glass particles to round beads. By virtue of the swirling air cushion provided around the interior of the furnace closely hugging the walls of the furnace, cooling is effected. This cooling of the furnace walls tends to minimize the formation of glass slag, which is undesirable in the formation of the glass beads, as continuing accretion and growth can require the furnace to be closed down. Also, through the provision of the swirling cushion of air the beads are subjected to an air cushion barrier when they move toward the inner sides of the furnace and they are pushed back in the central region of the furnace. Thus, any deformation and abrasions of the glass beads, caused by striking the side walls of the furnace, is minimized.

The admission of secondary air in the several stages described provides for continuing combustion of the gases throughout the furnace. Also, the admission of the secondary air provides for the continued maintenance of the air cushion to provide an additional advantage.

Although several stages have been provided both for the creation of the air cushion and for the admission of the secondary air, as fully brought out above, it will be readily understood by those skilled in the art that under some conditions only one stage, or even more stages than those described for the purpose of example herein, can be utilized. Other changes will be obvious to those skilled in the art and such changes and modifications are within the scope and teaching of this invention as defined by the claims appended hereto.

What is claimed is:

1. In a method of producing small glass beads in a furnace tube, the steps of introducing a combustion gas at a burner end of the tube, charging small glass particles entrained in air into the combustion gas at the burner end and directing the same toward an opposite end of the tube, producing combustion with the combustion gas and said air and charging said glass particles and the combustion gases toward the opposite end of the tube, and introducing air under pressure adjacent the burner end of the tube and tangentially to the interior of the tube and around the entire inner periphery of the tube to establish a circulating protective cushion of air along the interior periphery of said tube.

2. In a method of producing small glass beads in a furnace tube, the steps of introducing a combustion gas at a burner end of the tube, charging small glass particles entrained in air into the combustion gas, producing combustion with the combustion gas and said air and charging said glass particles and the combustion gases toward the opposite end of the tube, introducing air under pressure at several spaced locations from adjacent the burner end of the tube up to adjacent the discharge end of the tube, said air being introduced under pressure tangentially to the interior of the tube and around the entire inner periphery of the tube to establish a circulating protective cushion of air along the interior periphery of said tube.

3. In a method of producing small glass beads in a furnace tube, the steps of introducing a combustion gas at one end of the tube, charging small glass particles entrained in air into the combustion gas, producing combustion with the combustion gas and said air and charging said glass particles and the combustion gases toward the opposite end of the tube, introducing air under pressure between the ends of the tube tangentially to the interior of the tube and around the entire inner periphery of the tube to establish a circulating protective cushion of air along the interior periphery of said tube, drawing atmospheric air into the tube by suction adjacent the position where the aforementioned air under pressure is introduced, said last-named air being drawn in by suction at several spaced stages along the tube and around the entire inner periphery of the tube, directing said air in at least one of said stages interiorly of the cushion of air to serve as a source of secondary air for continuing combustion of the combustion gas, and directing suction air at another one of said stages at the interior surface of the furnace wall and around the entire inner periphery of the tube.

4. A heat treating furnace comprising a draft tube, a source of heat at one end of said tube so disposed as to direct heat into said tube, an inlet conduit in the heated end of the tube, means for introducing under pressure a material to be heat treated into said inlet conduit whereby said material may be directed into the heat in said tube to be heat treated and means for establishing a cushion of air around the interior periphery of said tube to provide cooling and establish a barrier against contact by said material, said last named means comprising a conduit connected substantially perpendicular to the axis of the tube having an outlet opening into the interior of said tube and around the entire inner periphery of the tube adjacent the inner wall surface, and means for charging air under pressure through said conduit to provide an air current along said inner wall surface of the tube.

5. A heat treating furnace comprising a draft tube, a source of heat at one end of said tube so disposed as to direct heat into said tube, an inlet conduit in the heated end of the draft tube, means for introducing under pressure a material to be heat treated into said inlet conduit whereby said material may be directed into the heat in said tube to be heat treated and means for establishing a cushion of air around the interior periphery of said tube to provide cooling and establish a barrier against contact by said material, said last named means comprising a conduit connected substantially perpendicular to the axis of the tube and tangentially to the draft tube and having an outlet opening adjacent the inner wall surface of said draft tube and around the entire inner periphery of the tube and means for charging air under pressure through said conduit to provide a helically directed air cushion along said inner wall surface of the tube, means for drawing atmospheric air into the tube by suction comprising openings around the entire inner periphery of the tube, said last named openings being situated interiorly of the aforementioned conduit outlet opening to serve as a source of secondary air for combustion within the tube.

6. A heat treating furnace comprising a draft tube, a source of heat at a first end of said tube so disposed as to direct heat into said tube, an inlet conduit in the heated end of the draft tube, means for introducing under pressure a material to be heat treated into said inlet conduit whereby said material may be directed into the heat in said tube to be heat treated and means for establishing a cushion of air around the interior periphery of said tube to provide cooling and establish a barrier against contact by said material, said last named means comprising a plurality of axially spaced conduits of progressively increasing diameter from the first end of the tube and having outlets around the entire inner periphery of the tube opening into the interior of said tube adjacent the inner wall surface and means for charging air under pressure through said conduits to provide a continuous air cushion in the tube along its inner wall surface, means for drawing atmospheric air into the tube by suction comprising openings around the entire inner periphery of the tube, said last named means being provided at several axially spaced locations along the tube, at least one of said stages having openings situated interiorly of the aforementioned conduit outlet opening to serve as a source of secondary air for combustion within the tube, and at least one other stage having openings situated at the interior surface of the furance wall.

7. A heat treating furnace comprising a draft tube, said tube comprised of a plurality of overlapping telescoped tubular sections, said sections having their walls concentrically spaced from the adjacent connections to provide an annular passage between said walls, a source of heat at a first end of said tube so disposed as to direct heat into said tube, an inlet conduit in the first end of the tube, means for introducing under pressure a material to be heat treated into said inlet conduit whereby said material may be directed into the heat in said tube to be heat treated, and means for charging air under pressure to at least one of said aforementioned annular passages, said means comprising an air conduit connected substantially perpendicular to the axis of the tube and tangentially to said passage, means closing one end of said passage, means opening the other end of said passage into the entire inner periphery of said tube and means for charging air under pressure through said conduit and around the entire inner periphery of the tube to provide an air current along said inner wall surface of the tube.

8. A heat treating furnace comprising a draft tube, said tube comprised of a plurality of overlapping telescoped tubular sections, said sections having their walls concentrically spaced from the adjacent connections to provide an annular passage between said walls, a source of heat at a first end of said tube so disposed as to direct heat into said tube, an inlet conduit in the first end of the tube, means for introducing under pressure a material to be heat treated into said inlet conduit whereby said material may be directed into the heat in said tube to be heat treated, means for charging air under pressure to at least one of said aforementioned annular passages, said means comprising an air conduit connected substantially perpendicular to the axis of the tube and tangentially to said passage, means closing one end of said passage, means opening the other end of said passage into the entire inner periphery of said tube, means for charging air under pressure through said conduit to provide an air current along said inner wall surface of the tube, said remaining passages being open at both ends to provide for drawing air into the tube by suction, and said aforementioned connection between the tube sections comprising connecting baffle plates slanted in the direction of the tangential connection of the aforementioned conduit to the tube to provide for the introduction of the suction air into the tube in substantial alignment with the current of air charged into the furnace through said conduit.

References Cited by the Examiner
UNITED STATES PATENTS

| | | | |
|---|---|---|---|
| 2,421,902 | 6/47 | Neuschotz | 65—21 |
| 2,619,776 | 12/52 | Potters | 65—21 |
| 2,783,544 | 3/57 | Bachmann et al. | 34—10 |
| 2,838,881 | 6/58 | Plumat | 65—142 |
| 2,976,574 | 3/61 | Keutgen et al. | 65—21 |

DONALL H. SYLVESTER, *Primary Examiner.*
CHARLES R. HODGES, *Examiner.*